United States Patent
Nortier

(10) Patent No.: US 6,550,744 B2
(45) Date of Patent: Apr. 22, 2003

(54) RELIEF VALVE HEAD FOR PISTON-STYLE FLUSH VALVE

(75) Inventor: Richard A. Nortier, Westchester, IL (US)

(73) Assignee: Sloan Valve Company, Franklin Park, IL (US)

( * ) Notice: Subject to any disclaimer, the term of this patent is extended or adjusted under 35 U.S.C. 154(b) by 41 days.

(21) Appl. No.: 09/895,574

(22) Filed: Jul. 2, 2001

(65) Prior Publication Data

US 2003/0001123 A1 Jan. 2, 2003

(51) Int. Cl.$^7$ .............................................. F16K 31/12
(52) U.S. Cl. ........................................................ 251/40
(58) Field of Search ........................... 251/40, 38, 339; 137/270, 271

(56) References Cited

U.S. PATENT DOCUMENTS

| | | | | |
|---|---|---|---|---|
| 2,369,104 A | * | 2/1945 | Fredrickson | 251/237 |
| 4,908,884 A | * | 3/1990 | John et al. | 4/295 |
| 5,476,244 A | * | 12/1995 | Carroll et al. | 251/40 |
| 6,408,873 B1 | * | 6/2002 | Hall et al. | 137/550 |

* cited by examiner

Primary Examiner—David A. Scherbel
Assistant Examiner—John K Fristoe
(74) Attorney, Agent, or Firm—Cook, Alex, McFarron, Manzo, Cummings & Mehler, Ltd.

(57) ABSTRACT

A flush valve includes a body having an inlet and an outlet. There is a valve seat at the outlet and a piston assembly movable in the body toward and away from the valve seat to control flow from the inlet through the outlet. A pressure chamber is located in the body above the piston assembly and normally maintains the piston assembly closed upon the valve seat. The piston assembly includes a refill orifice connecting the pressure chamber with the body inlet. The piston assembly includes a vent passage connecting the pressure chamber with the outlet. There is a relief valve in the piston assembly controlling flow through the vent passage. There is a seal extending about the vent passage and a spring urges the relief valve toward the seal to close the vent passage. The relief valve includes an outwardly directed shoulder positioned to close on the vent passage seal and a plurality of peripherally disposed indented flow openings in the shoulder to accommodate flow from the pressure chamber through the vent passage.

20 Claims, 2 Drawing Sheets

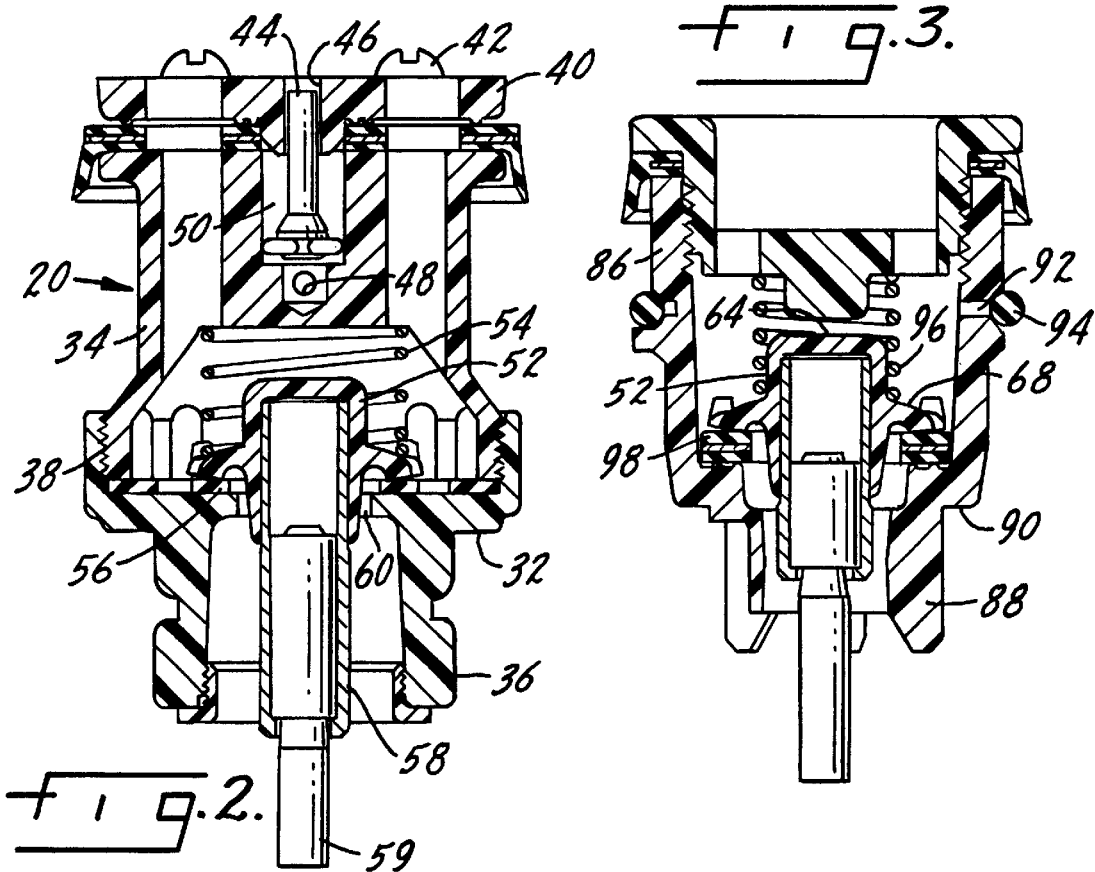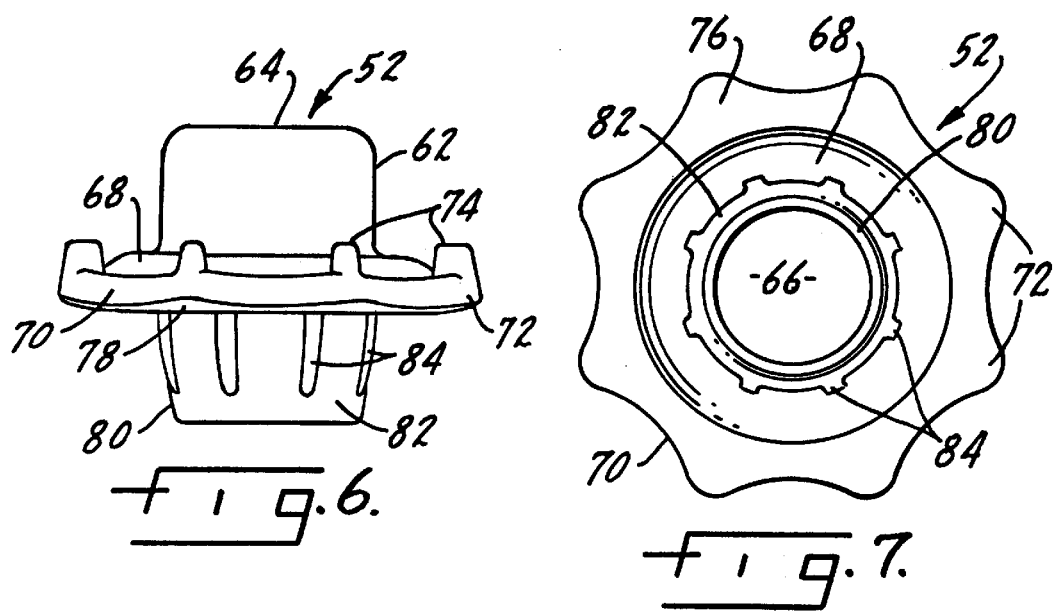

RELIEF VALVE HEAD FOR PISTON-STYLE FLUSH VALVE

THE FIELD OF THE INVENTION

The present invention relates to flush valves for use in connection with toilet devices such as urinals and water closets, and more specifically, to a piston-type flush valve. More particularly, the invention relates to a relief valve head intended for aggressive water conditions that can be used in more than one type of piston flush valve.

The relief valve functions as a semi-dynamic barrier between a pressurized water chamber above the flushometer piston and the fixture discharge outlet which is at a pressure close to atmospheric. To initiate the flush cycle, the relief valve is tipped by depressing the flushometer handle, thus venting the pressure chamber above the piston to the fixture outlet. This sudden pressure imbalance causes the piston to move upward from its seat and discharge a controlled volume of water. The relief valve returns to its rest position as soon as the flushometer handle or other actuation mechanism is released and the piston travels upward away from its seat area. The entire relief valve assembly contributes to controlling the flush volume delivered by an operating cycle of the valve. The flush volume is directly proportional to the length from the seating area of the head of the relief valve to the point at which the handle plunger strikes the relief valve stem.

The present invention provides a relief valve which has been designed specifically to accommodate two different size flushometer pistons. There are a plurality of points around the perimeter of the relief valve that function as a centering means for the smaller piston. The inward curve of the perimeter between these points acts to allow water to flow past when tipped and to clear alignment pins found on some old style pistons sold by Sloan Valve Company, the assignee of the present application, under the trademark NAVAL. There are also a plurality of standing ribs on the relief valve shoulder that function to capture a spring used on the larger piston of the NAVAL brand flush valve. The relief valve spring functions to insure proper closing of the valve and a tight seal at low pressures between the valve and the seat around the relief valve vent passage. The raised center area or hub of the relief valve accommodates a spring used on the GEM-style flush valves.

It is particularly advantageous that the relief valve shown and described herein is suitable for use on two different size and style of piston-type flushometers, both the GEM and the NAVAL products. This provides economy of scale in that one single part has multiple uses. Both the GEM and NAVAL flushometers are used in aggressive water conditions that include some combination of sediment and gray or sea water. The relief valve is particularly suitable in such an environment.

SUMMARY OF THE INVENTION

The present invention relates to piston-type flush valves for use with urinals and water closets and more specifically to an improved relief valve for use in the piston assembly.

A primary purpose of the invention is to provide a relief valve which is suitable for use in more than one style and size of piston-type flush valve.

Another purpose of the invention is to provide an improved relief valve head which has a perimeter which functions as an alignment or centering device for the relief valve.

Another purpose is to provide a relief valve as described which provides for centering the relief valve spring on larger size piston-type flushometers and for supporting the relief valve spring on smaller piston-type flushometers.

Another purpose of the invention is to provide a relief valve as described which insures complete closing of the relief valve but yet adequate water flow around it when the flush valve is operated.

Other purposes will appear in the ensuing specification, drawings and claims.

BRIEF DESCRIPTION OF THE DRAWINGS

The invention is illustrated diagrammatically in the following drawings wherein:

FIG. 2 is an axial section through one form of piston assembly;

FIG. 3 is an axial section through a second form of piston assembly;

FIG. 6 is a side view of the relief valve head; and

FIG. 7 is a bottom view of the relief valve head.

DESCRIPTION OF THE PREFERRED EMBODIMENT

The present invention relates to flush valves for use with urinals and water closets, and more specifically, to two types of piston flushometers sold by Sloan Valve Company of Franklin Park, Ill., under the trademarks NAVAL and GEM. This style of valve uses a piston assembly to control flow between the flush valve inlet and outlet. More specifically, the invention relates to an improved relief valve which controls flow between the pressure chamber above the piston assembly and the flush valve outlet, with movement of the relief valve functioning to relieve pressure in the pressure chamber to permit the piston assembly to rise and thus connect the flush valve inlet and outlet.

The relief valve functions as a semi-dynamic barrier between the pressurized water chamber above the flushometer piston and the discharge to the fixture which is at a pressure close to atmospheric. To initiate the flush cycle, the relief valve is tipped by depressing the flushometer handle, thus venting the pressure chamber above the piston to the fixture outlet. This sudden pressure imbalance causes the piston assembly to move upward from its seat and discharge a controlled volume of water. The relief valve returns to its rest position as the handle or other actuation mechanism is released and the piston travels upward away from its seat area. The entire relief valve assembly contributes to controlling flush valve volume.

Figure 1:
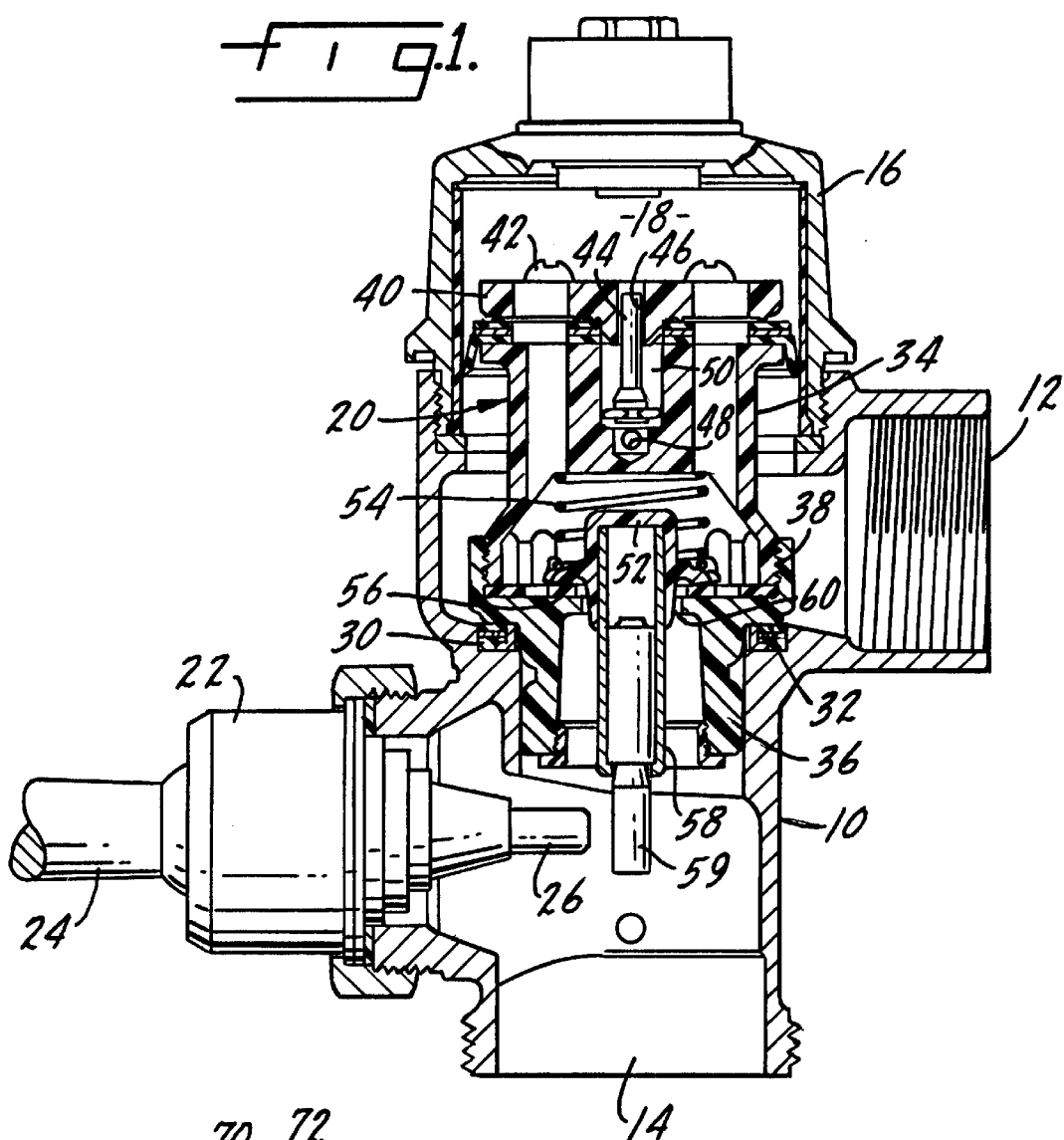
FIG. 1 is a partial axial section through a flush valve of the type described.
Figure 4:
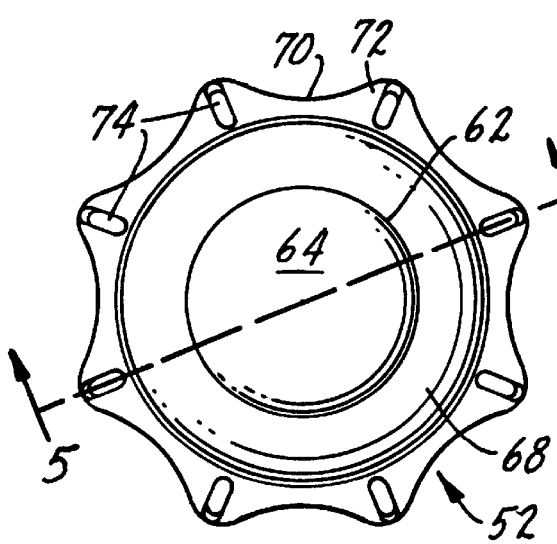
FIG. 4 is a top view of the relief valve head.
Figure 5:
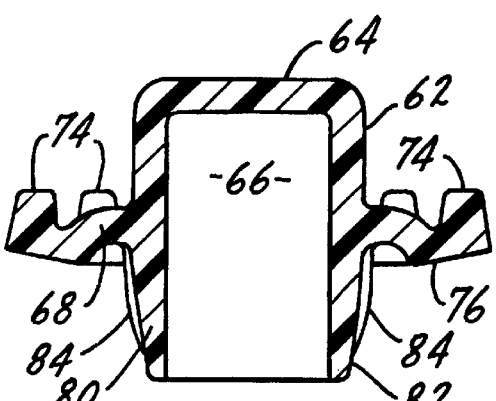
FIG. 5 is a section along plane 5—5 of FIG. 4.

In FIG. 1, the flush valve body is indicated at 10 and has an inlet 12 and an outlet 14. There is a top cover 16 which is threadedly attached to the body 10 and defines a pressure chamber 18 positioned above a piston assembly indicated generally at 20.

Adjacent the outlet 14 there is a handle assembly 22 which has a conventional manual handle 24 which, when activated, will move an interior plunger 26 which will cause the relief valve of the piston to move off its seat to institute the flushing cycle. This is conventional in valves of this type.

The body 10 includes a valve seat 30, with the piston assembly 20 having a surface 32 which closes upon the valve seat to prevent flow between the inlet 12 and the outlet 14.

The piston assembly 20 includes a piston 34 and a guide 36 threadedly attached, as at 38. The piston assembly has a top plate 40 mounted by screws 42 to the piston 34. A rod 44 moves within a passage 46 in the top plate 40 to control the flow of water from an opening 48 in the piston 34. The opening 48 is connected to the inlet 12 and water will flow through the opening 48 into a chamber 50, around the rod, and then outwardly through the passage 46 into the pressure chamber 18. The space between rod 44 and passage 46 functions as the bypass orifice. Water within the pressure chamber 18 maintains the piston assembly on its valve seat 30 to close flow between the inlet and the outlet.

There is a relief valve 52 biased by a spring 54 onto a relief valve seat 56 which may be a suitable sealing element. The relief valve has a stem 59 which extends downwardly into body 10 and is positioned adjacent the plunger 26. The guide 36 has a vent passage 60 through which the stem of the relief valve passes. The vent passage controls and permits flow from the pressure chamber 18 to the outlet 14 when the relief valve is moved off of its seat by actuation of the handle 24 or any other suitable type of actuation device.

In operation, when the handle is moved, the plunger will move into the body 10 causing the relief valve to tilt off of its seal 56, permitting the pressure chamber 18 to vent through passage 60 and outlet 14 which permits the piston assembly to move up, off of its seat 30, so that there is direct flow between the inlet and the outlet. As is known in the art, flow through the bypass orifice determines flow into the pressure chamber 18 to control the time during which the piston is off the valve seat and thus the volume of flow through the flush valve.

The present invention is specifically concerned with the construction of the relief valve head which is indicated in detail in FIGS. 4 through 7. FIG. 3 illustrates the relief valve as used in the GEM-brand flushometer, whereas, FIGS. 1 and 2 illustrate the relief valve as used in the NAVAL-brand flushometer. The relief valve is the same in each instance.

Focusing on FIGS. 4 through 7, the relief valve includes a body 62 having a dome 64. There is a central cavity 66 which receives the relief valve gland 58. The relief valve stem 59 is positioned within gland 58. The body 62 has an outwardly-extending peripheral shoulder 68 which, as particularly illustrated in FIG. 4, has a plurality, in this case eight, peripherally spaced curved indentations 70. These indentations will assist water flow past the refill head through the vent passage when the relief valve is tilted. They will also allow the refill head to clear alignment pins on certain old-style NAVAL flushometers. At each projection 72, formed between indentations 70, there is an upstanding rib 74 which functions to properly position and support the spring 54 as clearly shown in FIGS. 1 and 2. Thus, the ribs 74 locate the spring, which in turn biases the relief valve to its closed position.

As shown specifically in FIG. 6, the underside 76 of shoulder 68 has a series of undulations 78 which generally correspond with the indentations 70 to assist in the flow of water past the relief valve head.

There is a downwardly-extending sleeve 80 which forms a part of the relief valve head body 62, which sleeve has a lower tapered surface 82 and a plurality of gently inwardly-tapering ribs 84. The ribs 84 assist proper alignment of the relief valve within the vent passage 60 when it moves to its closed position shown in FIGS. 1 and 2.

Turning to FIG. 3, and the GEM-style flushometer, the relief valve is the same as used in the NAVAL-brand flushometer. The piston assembly includes a hollow, generally cylindrical piston 86 which has a lower cylindrical extension 88 which is directly adjacent a piston seat area 90, with the seat area 90 being normally seated upon a seal member, not shown. There is a bypass orifice 92 controlled by a filter ring 94. Further details of the GEM-style flushometer are shown in U.S. Pat. No. 5,881,993, the disclosure of which is herein incorporated by reference.

Focusing specifically on the relief valve, there is a spring 96 which extends about and is located by the dome 64. This spring urges the relief valve to the closed position in FIG. 3 in which the shoulder 68 is closed upon a seat or seal 98. The outwardly extending projections 72 located between the undulations 70 function to properly locate and center the relief valve so as to maintain it in its appropriate position to close upon seat 98. In other respects the relief valve functions in the manner described above and the only difference is the piston assembly environment in which the relief valve is located.

Whereas the preferred form of the invention has been shown and described herein, it should be realized that there may be many modifications, substitutions and alterations thereto.

The embodiments of the invention in which an exclusive property or privilege is claimed are as follows:

1. A flush valve including a body having an inlet and an outlet, a valve seat at said outlet, a piston assembly movable in said body toward and away from said valve seat to control flow from said inlet through said outlet, a pressure chamber in said body above said piston assembly and normally maintaining said piston assembly closed upon said valve seat, said piston assembly including a refill orifice connecting said chamber with said body inlet, said piston assembly having a vent passage connecting said pressure chamber with said outlet, a relief valve in said piston assembly controlling flow through said vent passage, means for opening said relief valve to vent said chamber, causing said piston assembly to move away from said valve seat to open flow through said outlet, a seal extending about said vent passage, spring means urging said relief valve toward said seal to close said vent passage, said relief valve including an outwardly directed shoulder positioned to close on said vent passage seal, and a plurality of peripherally disposed indented flow openings in said shoulder to accommodate flow from said pressure chamber through said vent passage.

2. The flush valve of claim 1 wherein said relief valve shoulder has a lower undulating surface facing said vent passage seal.

3. The flush valve of claim 2 wherein said peripherally disposed indented flow openings are generally co-extensive with the undulations on the lower surface of said shoulder.

4. The flush valve of claim 1 wherein said relief valve includes a downwardly extending sleeve disposed toward the flush valve opening, said sleeve having peripherally spaced axially extending ribs thereon.

5. The flush valve of claim 4 wherein the exterior of said sleeve is inwardly tapered.

6. The flush valve of claim 4 wherein said axially extending ribs are inwardly tapered.

7. The flush valve of claim 1 wherein said relief valve includes an upwardly extending generally cylindrical dome, said spring means being seated on said relief valve shoulder and extending about said dome.

8. The flush valve of claim 7 wherein said spring means is a coiled spring.

9. The flush valve of claim 1 wherein said relief valve shoulder, on an upper surface thereof, includes a plurality of spaced upwardly extending ribs, said spring means being centered by said ribs.

10. The flush valve of claim 9 wherein said spring means includes a coiled spring, with the lower coil thereof being located within said shoulder ribs.

11. A piston assembly for use in a flush valve body having an inlet and an outlet, the piston assembly being movable in said flush valve body toward and away from a valve seat to control flow from the inlet through the outlet, said piston assembly including a vent passage connected to the outlet, a relief valve in said piston assembly controlling flow through said vent passage, a seal extending about said vent passage, spring means urging said relief valve toward said vent passage seal to close said vent passage, said relief valve including an outwardly directed shoulder positioned to close on said vent passage seal, and a plurality of peripherally disposed indented flow openings in said shoulder to accommodate flow through said vent passage.

12. The piston assembly of claim 11 wherein said relief valve shoulder has a lower undulating surface facing said vent passage seal.

13. The piston assembly of claim 12 wherein said peripherally disposed indented flow openings are generally co-extensive with the undulations on the lower surface of said shoulder.

14. The piston assembly of claim 11 wherein said relief valve includes a downwardly extending sleeve disposed toward the flush valve opening, said sleeve having peripherally spaced axially extending ribs thereon.

15. The piston assembly of claim 14 wherein the exterior of said sleeve is inwardly tapered.

16. The piston assembly of claim 14 wherein said axially extending ribs are inwardly tapered.

17. The piston assembly of claim 11 wherein said relief valve includes an upwardly extending generally cylindrical dome, said spring means being seated on said relief valve shoulder and extending about said dome.

18. The piston assembly of claim 17 wherein said spring means is a coiled spring.

19. The piston assembly of claim 11 wherein said relief valve shoulder, on an upper surface thereof, includes a plurality of spaced upwardly extending ribs, said spring means being centered by said ribs.

20. The piston assembly of claim 19 wherein said spring means includes a coiled spring, with the lower coil thereof being located within said shoulder ribs.

* * * * *